US011921847B1

(12) United States Patent
Mantin et al.

(10) Patent No.: US 11,921,847 B1
(45) Date of Patent: Mar. 5, 2024

(54) DETECTION OF ABNORMAL APPLICATION PROGRAMMING INTERFACE (API) SESSIONS INCLUDING A SEQUENCE OF API REQUESTS USING SPACE PARTITIONING DATA STRUCTURES

(71) Applicant: INTUIT INC., Mountain View, CA (US)

(72) Inventors: Itsik Yizhak Mantin, Shoham (IL); Laetitia Kahn, Tel Aviv (IL); Sapir Porat, Hod Hasharon (IL); Yaron Sheffer, Hod-Hasharon (IL)

(73) Assignee: Intuit, Inc., Mountain View, CA (US)

( * ) Notice: Subject to any disclaimer, the term of this patent is extended or adjusted under 35 U.S.C. 154(b) by 0 days.

(21) Appl. No.: 18/351,703

(22) Filed: Jul. 13, 2023

(51) Int. Cl.
*G06F 21/00* (2013.01)
*G06F 21/54* (2013.01)
*G06F 21/55* (2013.01)

(52) U.S. Cl.
CPC ............ *G06F 21/552* (2013.01); *G06F 21/54* (2013.01)

(58) Field of Classification Search
CPC ............................... G06F 21/54; G06F 21/552
USPC .......................................................... 726/22
See application file for complete search history.

(56) References Cited

U.S. PATENT DOCUMENTS

| 9,990,687 | B1 * | 6/2018 | Kaufhold | H04N 1/32267 |
| 11,263,321 | B2 * | 3/2022 | Subbarayan | G06F 21/552 |
| 11,349,812 | B2 * | 5/2022 | Biradar | H04L 63/14 |
| 11,537,448 | B1 * | 12/2022 | Chari | G06F 9/54 |
| 11,687,540 | B2 * | 6/2023 | Pushak | G06N 3/045 |
| | | | | 707/776 |
| 2019/0114417 | A1 * | 4/2019 | Subbarayan | G06F 9/54 |
| 2022/0100800 | A1 * | 3/2022 | Georgopoulos | G06N 5/022 |
| 2022/0321587 | A1 * | 10/2022 | Guntar | G06F 9/541 |

FOREIGN PATENT DOCUMENTS

CN 116361801 * 6/2023 ............. Y02D 10/00

* cited by examiner

*Primary Examiner* — Josnel Jeudy
(74) *Attorney, Agent, or Firm* — Patterson + Sheridan, LLP

(57) ABSTRACT

A computer-implemented method includes receiving training data that includes a plurality of API requests from a plurality of client devices. The method includes generating a plurality of permissible API sessions based on the training data. Each of the permissible API sessions is associated with a corresponding client device of the plurality of client devices and includes a sequence of API requests originating from the corresponding client device. The method includes applying a sequence embedding technique to the plurality of permissible API sessions to generate a plurality of embeddings and applying a dimensionality reduction technique to the plurality of embedding to generate a plurality of compact embeddings. The method includes storing each of the compact embeddings in a space partitioning data structure at storage locations within the space partitioning data structure that are determined based on similarities between the compact embeddings.

17 Claims, 6 Drawing Sheets

DETECTION OF ABNORMAL APPLICATION PROGRAMMING INTERFACE (API) SESSIONS INCLUDING A SEQUENCE OF API REQUESTS USING SPACE PARTITIONING DATA STRUCTURES

INTRODUCTION

Aspects of the present disclosure are directed to techniques for detecting abnormal API sessions. More particularly, the present disclosure is directed to techniques for using space partitioning data structures to facilitate detection of an abnormal sequence of API requests included in an API session.

BACKGROUND

Application programming interfaces (APIs) are generally used to expose various routines and methods to software developers for use in obtaining and modifying data using features of a software application. APIs may be accessible programmatically (e.g., as function calls in an application or function library) or via a web-service (e.g., Web Services Description Language (WSDL)) for web-based applications. For example, developers may use APIs to build web applications or mobile applications that include functionality and user interface components invoked through the API.

Because APIs are so commonplace, bad actors (e.g., hackers) may perform different attacks through APIs to gain access to an organizations' infrastructure. To that end, API security models have been developed to automatically detect and prevent certain types API attacks implemented by bad actors. For instance, conventional API security models may automatically detect API attacks in which the bad actor sends an abnormal volume of API requests. However, conventional API security models may not detect every type of API attack. For instance, API attacks in the form of an abnormal sequence of API requests associated with an API session may go undetected by conventional API security models.

Accordingly, there is a need for improved techniques for automatically detecting and preventing API attacks.

BRIEF SUMMARY

In one aspect, a computer-implemented method is provided. The computer-implemented method includes receiving training data that includes a plurality of API requests from a plurality of client devices. The method includes generating a plurality of permissible API sessions based on the training data. Each of the plurality of permissible API sessions is associated with a corresponding client device of the plurality of client devices and includes a sequence of API requests originating from the corresponding client device. The method includes applying a sequence embedding technique to the plurality of permissible API sessions to generate a plurality of embeddings. The method includes applying a dimensionality reduction technique to the plurality of embedding to generate a plurality of compact embeddings. The method includes storing each of the compact embeddings in a space partitioning data structure at storage locations within the space partitioning data structure that are determined based on similarities between the compact embeddings. Furthermore, the space partitioning data structure is searchable to determine whether compact embeddings of future API sessions are abnormal based, at least in part, on a comparison of the compact embeddings stored in the space partitioning data structure.

In another aspect, a method is provided. The method includes receiving data that includes a plurality of API requests from a plurality of client devices. The method includes generating a plurality of API sessions based on the data. Each of the API sessions is associated with a corresponding client device of the plurality of client devices and includes a sequence of API requests originating from the corresponding client device. The method includes applying a sequence embedding technique to the plurality of API sessions to generate a plurality of embeddings. The method includes applying a dimensionality reduction technique to the plurality of embeddings to generate a plurality of compact embeddings. The method includes comparing each of the plurality of compact embeddings to one or more of a plurality of reference compact embeddings stored in a space partitioning data structure and indicative of permissible API sessions generated based on training data. The plurality of reference compact embeddings are stored such that similar reference compact embeddings of the plurality of reference compact embeddings are located near one another within the space partitioning data structure. The method includes determining one or more API sessions of the plurality of API sessions generated based on the data are abnormal based, at least in part, on the comparing.

In yet another aspect, a computing system is provided. The computing system includes one or more processors and one or more memory configured to store computer executable instructions that, when executed by the one or more processors, cause the one or more processors to: receive training data that includes a plurality of API requests from a plurality of client devices; generate a plurality of permissible API sessions based on the training data, with each of the plurality of permissible API sessions is associated with a corresponding client device of the plurality of client devices and including a sequence of API requests originating from the corresponding client device; apply a sequence embedding technique to the plurality of permissible API sessions to generate a plurality of embeddings; apply a dimensionality reduction technique to the plurality of embedding to generate a plurality of compact embeddings; and store each of the compact embeddings in a space partitioning data structure at storage locations within the space partitioning data structure that are determined based on similarities between the compact embeddings. Furthermore, the space partitioning data structure is searchable to determine whether compact embeddings of future API sessions are abnormal based, at least in part, on a comparison of the compact embeddings stored in the space partitioning data structure.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
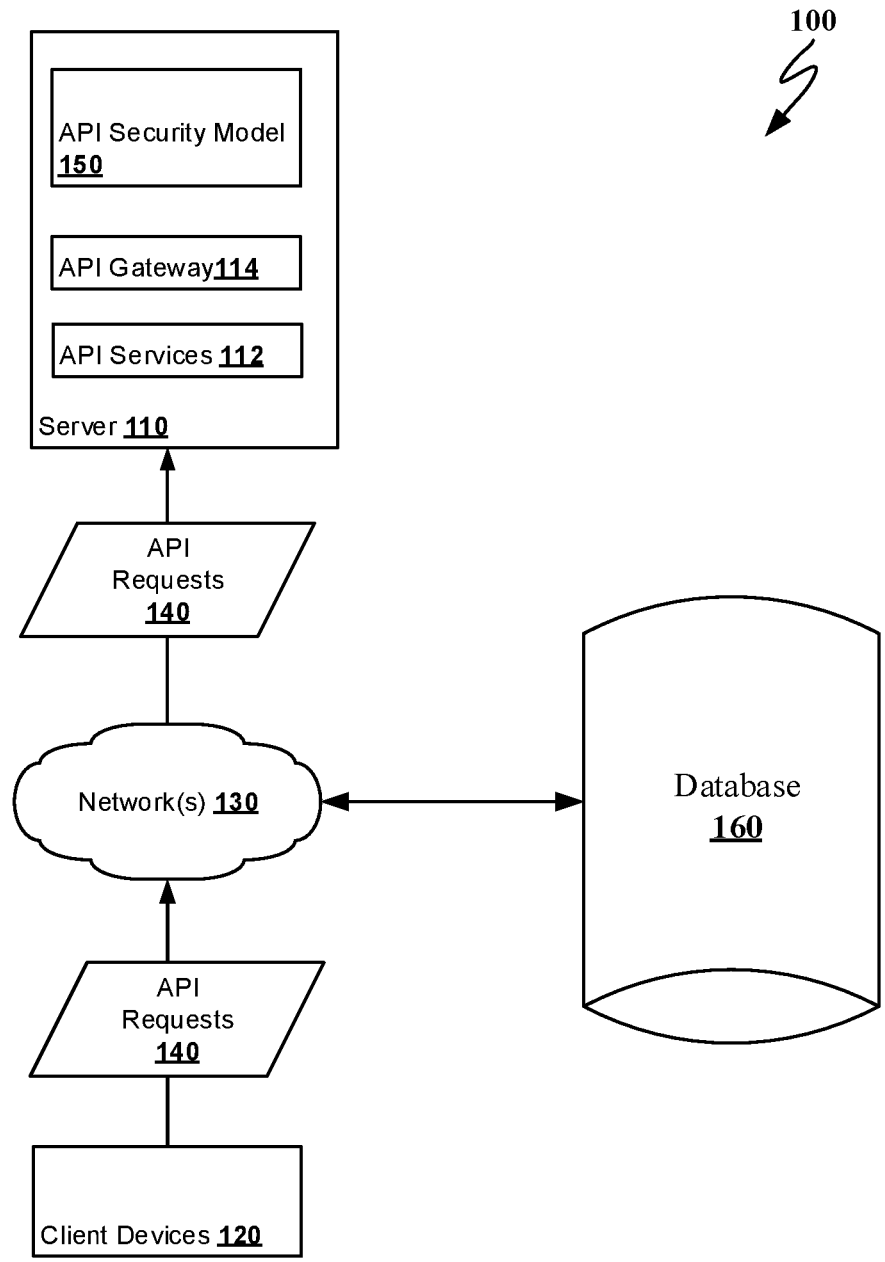
FIG. 1 depicts a computing environment for detecting abnormal API sessions according to some embodiments of the present disclosure.

Aspects of the present disclosure provide apparatuses, methods, computing systems, and computer readable medium for detecting abnormal sequences of API requests.

Existing API security models may automatically detect and prevent certain types of API attacks by bad actors (e.g., hackers). For instance, existing API security models may detect API attacks in which a bad actor sends an abnormal volume of API requests. However, existing API security models cannot detect every type of API attack. For instance, existing API security models cannot detect API attacks in the form of an abnormal sequence of API requests. Thus, organizations utilizing existing API security models to protect their infrastructure are vulnerable to these types of API attacks (e.g., abnormal sequences of API requests).

Example aspects of the present disclosure are directed to API security models for automatically detecting and preventing API attacks in the form of abnormal sequences of API requests. An API security model according to the present disclosure may be operable in a training phase and an inference phase. When the API security model is operating in the training phase, the API security model obtains training data that includes a plurality of API requests from a plurality of different client devices. The API security model may generate a plurality of permissible API sessions based on the training data. Each of the plurality of permissible API sessions may include a sequence of API requests originating from a corresponding client device of the plurality of client devices. It should be understood that the sequence of API requests refers to a sequence of API requests made to various endpoints (e.g., API services). It should also be understood that the number of API requests included in the sequence of API requests may range from 3 API requests to 1,000 or more API requests.

Given the large volume of permissible API sessions, the API security model may be configured to apply a sequence embedding technique to the plurality of permissible API sessions to embed the plurality of permissible API sessions in a multi-dimensional Euclidian space. For instance, in some embodiments, the sequence embedding technique used to generate the embeddings (that is, a vector representation of each API session in the Euclidian space) may be a sequence graph transformation technique. This particular technique generates the embeddings in such a way so as to preserve similarity between API sessions that are similar to one another. More specifically, the embeddings generated for similar API sessions may be close to one another in the multi-dimensional Euclidian space.

As described in more detail below with respect to FIG. 2, the API security model may apply a dimensionality reduction technique to the plurality of embeddings to generate a plurality of compact embeddings that are smaller in size (e.g., less dimensions) compared to the initial embeddings of the permissible API sessions. In this manner, more computationally efficient and focused comparisons of the embeddings may occur.

The API security model may be configured to store the plurality of compact embeddings in a space partitioning data structure. For instance, in some embodiments, the space partitioning data structure may include a K-D tree. In such embodiments, each of the compact embeddings may be stored at efficient locations within the K-D tree data structure. More specifically, compact embeddings that are similar to one another (e.g., based on Euclidian distance) may be stored at locations in the space partitioning data structure that are selected so as to minimize the distance within the space partitioning data structure between the compact embeddings that are similar to one another. Distance within the space partitioning data structure may be measured by, for example, a number of hops in a K-D tree between two compact embeddings that have been stored in the K-D tree.

With the space partitioning data structure populated with compact embeddings representative of permissible API sessions, the API security model may switch from the training phase to the inference phase. In the inference phase, the API security model may receive data that includes a plurality of API requests from a plurality of client devices. The API security model may be configured to generate a plurality of API sessions based on the data. Each of the API sessions may be associated with a corresponding client device of the plurality of client devices and may include a sequence of API requests originating from the corresponding client device.

The API security model may be configured to apply the sequence embedding technique (e.g., sequence graph transformation) to the plurality of API sessions to generate a plurality of embeddings. The API security model may be further configured to apply a dimensionality reduction technique to the plurality of embeddings to generate a plurality of compact embeddings. In some embodiments, each of the embeddings may include 1,000 or more dimensions. In such embodiments, the dimensionality reduction technique may be applied to the plurality of embeddings to reduce the total number of dimensions to be a smaller number, such as less than 100 dimensions. Thus, in some embodiments, each of the plurality of compact embeddings may include less than 100 dimensions.

The API security model may be configured to search the space partitioning data structure to identify which of a plurality of reference compact embeddings (that is, the compact embeddings of permissible API sessions determined during the training phase) stored in the space partitioning data structure is closest to each of the compact embeddings received from the dimensionality reduction module. More specifically, for each of the API sessions generated based on the data, the anomaly detection module may store the corresponding compact embedding within the space partitioning data structure such that the corresponding compact embedding is stored near to other compact embeddings that are similar to the corresponding compact embedding (e.g., based on Euclidian distance), and may determine whether a distance between the corresponding compact embedding and a reference compact embedding that is closest to the corresponding compact embedding in the space partitioning data structure and corresponding to a permissible API session exceeds a threshold distance.

Alternatively, the corresponding compact embedding of each of the API sessions generated based on the data may not be stored in the space partitioning data structure, and the reference compact embedding in the space partitioning data structure that is closest to the corresponding compact embedding may be determined by searching the space partitioning data structure (e.g., using a nearest neighbor search algorithm) to retrieve compact embeddings that are similar to the corresponding compact embedding. In either case, searching the space partitioning data structure for reference compact embeddings that are similar to the corresponding compact embedding will be more efficient as a result of the storage organization of the space partitioning data structure (e.g., with similar compact embeddings being stored near one another in the space partitioning data structure).

If, for one or more of the API sessions, the API security model determines the distance between the corresponding compact embedding and the reference compact embedding exceeds the threshold distance, the API security model may perform one or more actions. For instance, in some embodiments, the anomaly detection module may generate a notification indicative of the one or more API sessions being abnormal. Alternatively, or additionally, the anomaly detection module may be configured to update a database to include the one or more API sessions. In this manner, a record of API sessions that have been determined to be abnormal can be stored on the database.

Example aspects of the present disclosure provide numerous technical effects and benefits. For instance, API security models according to the present disclosure provide improved security against API attacks in the form of abnormal sequences of API requests to which existing API security models are vulnerable. Furthermore, by utilizing a sequence graph transformation technique as well as dimensionality reduction techniques, API security models according to the present disclosure may allow API sessions to be compared in a more computationally efficient manner, thereby improving the efficiency of involved processes and improving the functioning of involved computing devices. Still further, by storing compact embeddings of permissible API sessions in a space partitioning data structure such that compact embeddings that are similar to one another (e.g., based on Euclidian distance) are stored near to one another within the space partitioning data structure (e.g., with distance within the space partitioning data structure being based on a number of hops in a tree between two compact embeddings), API security models according to the present disclosure may search the compact embeddings stored thereon in a more computationally efficient manner, thereby further improving the efficiency of involved processes and the functioning of involved computing devices.

Example Computing Environment for API Security

FIG. 1 illustrates a computing environment 100 for providing API security according to some embodiments of the present disclosure. The computing environment 100 may include a server 110 and a plurality of client devices 120 (only one shown). Each of the plurality of client devices 120 (e.g., mobile phone, tablet, laptop, etc.) may be communicatively coupled to the server 110 via one or more networks 130. Examples of the network(s) 130 may include, without limitation, a wide area network (WAN), a local area network (LAN), and/or a cellular network.

Each of the plurality of client devices 120 may communicate a plurality of API requests 140 to the server 110. For instance, a first client device of the client devices 120 may communicate a first sequence of API requests to the server 110. Likewise, a second client device of the client devices 120 may communicate a second sequence of API requests to the server 110.

It should be understood that the first sequence of API requests the server 110 receives from the first client device may be different from the second sequence of API requests the server 110 receives from the second client device. For example, the first sequence of API requests received from the first client device may be "ABBBBC" and the second sequence of API requests received from the second client device may be "ABCBCBBC" in which "A" represents an API request for a first API service (e.g., endpoint) of a plurality of different API services 112, "B" represents an API request for a second API service (e.g., endpoint) of the plurality of different API services 112, and "C" represents an API request for a third API service (e.g., endpoint) of the plurality of different API services 112. It should also be understood that the sequence of API requests may include any suitable number of API requests. For instance, in some embodiments, the sequence of API requests 140 may include 100 or more API requests.

In some embodiments, the server 110 may include an API gateway 114. The API gateway 114 may be configured to receive the sequence of API requests from each of the plurality of client devices 120. For instance, the API gateway 114 may receive the first sequence of API requests (e.g., "ABBBBC") from the first client device and the second sequence of API requests (e.g., "ABCBCBB") from the second client device.

The API gateway 114 may be configured to communicate each of the plurality of API requests within the sequence of API requests to a corresponding API service of the API services 112. For example, the API gateway 114 may communicate API request "A" within the sequence of API requests to a first API service of the API services 112. Likewise, the API gateway 114 may communicate API request "B" within the sequence of API requests to a second API of the API services 112.

The API gateway 114 may be configured to receive responses from the API services 112. For instance, a first API service may generate a response to receiving API request "A" from the first client device. The API gateway 114 may receive the response and communicate the response to the first client device. In this manner, responses to API requests may be communicated from an API service to a corresponding client device.

The server 110 may include an API security model 150. As will be discussed below in more detail with reference to FIGS. 2 and 3, the API security model 150 may be operated in a training phase (FIG. 2) to generate a plurality of patterns of permissible API sessions (e.g., sequences of API requests originating from corresponding client devices) and subsequently an inference phase (FIG. 3) in which the API security model 150 detects abnormal API sessions based, at least in part, on the plurality of patterns generated during the training phase.

Although the API security model 150 is depicted as being on the server 110, it should be appreciated that, in alternative embodiments, functions associated with the API security model 150 may be distributed across multiple devices. For instance, in some embodiments, certain functions (e.g., functions associated with inference phase of FIG. 3) of the API security model 150 may be performed by the server 110 and certain other functions (e.g., functions associated with training phase of FIG. 2) of the API security model 150 may be performed by a computing device (not shown) that is separate from the server 110.

The computing environment 100 may include a database 160 communicatively coupled to the server 110 via the network(s) 130. In this manner, the server 110, specifically the API security model 150 thereof, may access (e.g., read, write) the database 160. For instance, the plurality of patterns of permissible API sessions determined by the API security model 150 during the training phase may be stored on the database 160. Furthermore, the plurality of patterns of permissible API sessions may be accessed by the API security model 150 during the inference phase. In this manner, the API security model 150 may compare API sessions generated during the inference phase to the plurality of patterns to determine whether the API sessions are abnormal.

Operation of API Security Model in Training Phase

Figure 2:
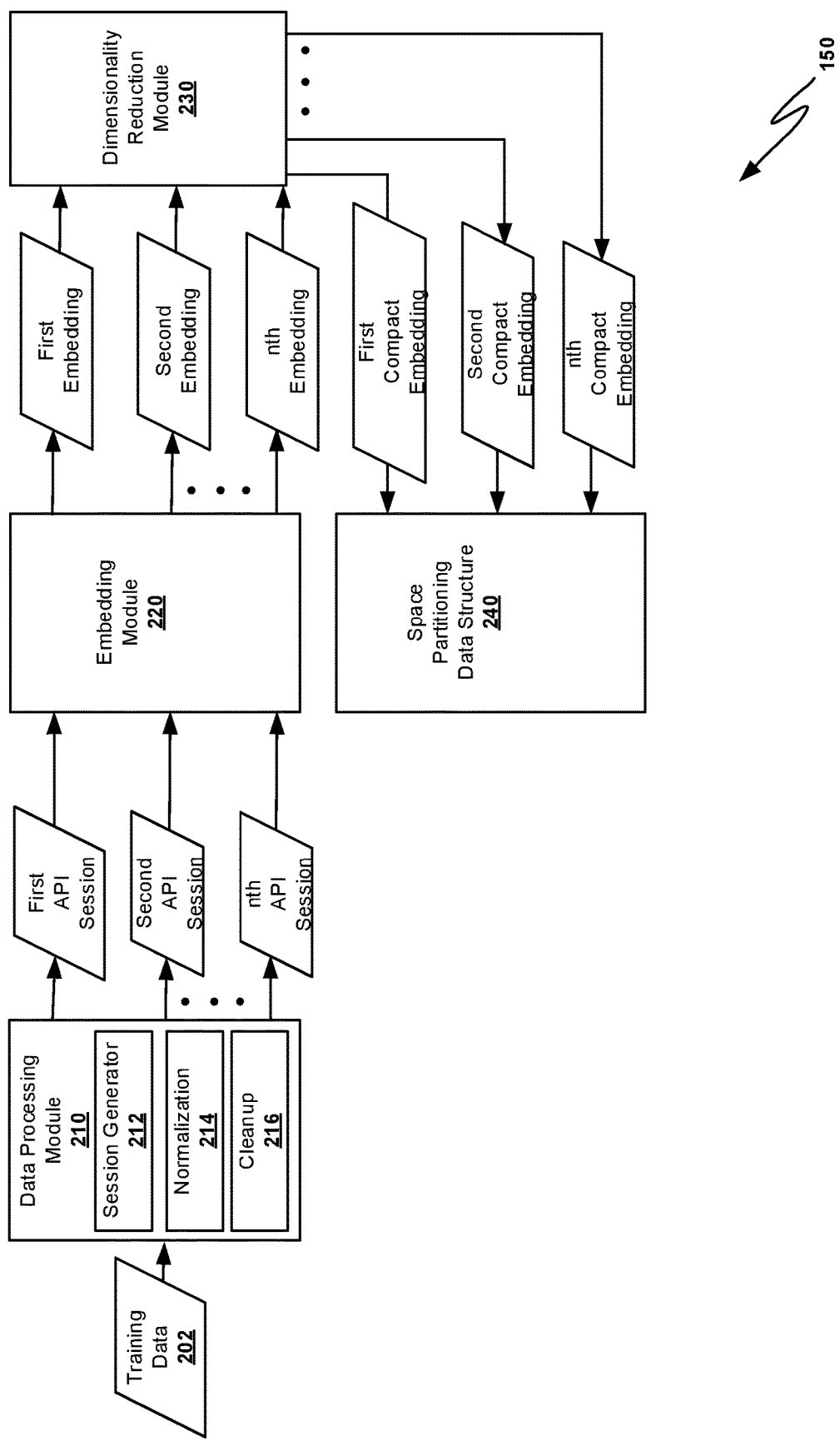
FIG. 2 depicts an API security model operating in a training phase to populate a space distributing data structure with compact embeddings of permissible API sessions according to some embodiments of the present disclosure.

FIG. 2 depicts the API security model 150 operating in a training phase to populate a space partitioning data structure with compact embeddings representative of permissible API sessions according to some embodiments of the present disclosure. As shown, the API security model 150 may include a data processing module 210. The data processing module 210 may receive training data 202 that includes a plurality of API requests from a plurality of different client devices (such as the client devices 120 of FIG. 1).

The data processing module 210 may include one or more submodules. For instance, in some embodiments, the one or more submodules may include a session generator 212. The session generator 212 may be configured to generate a plurality of permissible API sessions based on the training data 202. In some embodiments, the session generator 212 may group the API requests by client device. For instance, the session generator 212 may generate a first permissible API session for all API requests included in the training data 202 and originating from a first client device of the plurality of client devices. Additionally, the session generator 212 may generate a second API session for all API requests included in the training data 202 and originating from a second client device of the plurality of client devices. It should be understood that the session generator 212 may be configured to generate the plurality of permissible API sessions based on any suitable attribute (e.g., similar user, similar network location, and similar time) of the training data 202 and, more specifically, the sequences of API requests included therein.

In some embodiments, the one or more submodules of the data processing module 210 may include a normalization module 214. The normalization module 214 may be configured to process the permissible API sessions generated by the session generator 212. For instance, in some embodiments, the normalization module 214 may be configured to determine whether a sequence of API requests included in each of the permissible API sessions includes greater than a threshold number of consecutive API requests for a particular API service. For example, if the sequence of API requests for one of the permissible API sessions is "ABBBBBC", the normalization module 214 may determine whether the consecutive API requests for API service "B" exceeds a threshold number. Furthermore, if the normalization module 214 determines the number of consecutive API requests for API service "B", the normalization module 214 may, in some embodiments, remove one or more instances of the API request for API service "B" until the API session includes the threshold number of consecutive API requests for API service "B".

In some embodiments, the one or more submodules of the data processing module 210 may include a cleanup module 216. The cleanup module 216 may, in some embodiments, be configured to process each of the permissible API sessions to determine whether the sequence of API requests included in each of the permissible API sessions includes a threshold number (e.g., at least 3) of API requests. Furthermore, if the cleanup module 216 determines the sequence of API requests included in one or more of the API session is less than the threshold number, the cleanup module 216 may be configured to remove (e.g., delete) the one or more permissible API sessions from the plurality of permissible API sessions. Alternatively, or additionally, the cleanup module 216 may be configured to determine whether the sequence of API requests for one or more of the permissible API session is suspicious. For instance, if the sequence of API requests is similar or identical to a sequence of API requests known to be associated with an API attack (e.g., based on historical data associated with historical API attacks and/or user input indicating sequences of API requests that are associated with API attacks), the cleanup module 216 may be configured to remove (e.g., delete) the permissible API session from the plurality of permissible API sessions.

The API security model 150 may include an embedding module 220. The embedding module 220 may receive the plurality of permissible API sessions (e.g., first API session, second API session . . . nth API session) from the data processing module 210. The embedding module 220 may be configured to apply a sequence embedding technique to the plurality of permissible API sessions to generate a plurality of embeddings (e.g., first embedding, second embedding . . . nth embedding). Each of the plurality of embeddings corresponds to a different permissible API session of the plurality of permissible API sessions received from the data processing module 210. Furthermore, in some embodiments, each of the embeddings may be a vector representation of the corresponding permissible API session (e.g., sequence of API requests). Still further, in some embodiments, the vector representation may include 100 or more dimensions. More specifically, in some embodiments, the vector representation may include 1,000 or more dimensions.

In some embodiments, the sequence embedding technique may include a sequence graph transformation. The sequence graph transformation technique may generate the plurality of embeddings in a way that preserves similarity between permissible API sessions that are similar to one another. For instance, embeddings for permissible API sessions that are similar to one another will be vectors that are close to one another in the multi-dimensional Euclidian space.

The API security model 150 may include a dimensionality reduction module 230. The dimensionality reduction module 230 may receive the plurality of embeddings (e.g., first embedding, second embedding . . . nth embedding) from the embedding module 220. The dimensionality reduction module 230 may be configured to apply a dimensionality reduction technique to the plurality of embeddings to generate a plurality of compact embeddings (e.g., first compact embedding, second compact embedding . . . nth compact embedding). For instance, in some embodiments, the dimensionality reduction technique may include a principal component analysis (PCA).

It should be appreciated that the dimensionality reduction module 230 may, in some embodiments, be configured to reduce the number of dimensions in each of the plurality of embeddings by a threshold number. For instance, in some embodiments, the dimensionality reduction module 230 may be configured to reduce the number of dimensions from about 1,000 dimension to about 30 dimensions (these numbers are included as examples, and other numbers are possible). As used herein, user of the term "about" refers to a range of values without 20 percent of the stated numerical value.

The API security model 150 may be configured to store the plurality of compact embeddings in a space partitioning data structure 240. For instance, in some embodiments, the space partitioning data structure 240 may include a K-D tree. In such embodiments, each of the compact embeddings (e.g., first compact embedding, second compact embeddings . . . nth compact embeddings) may be stored at efficient locations within the K-D tree data structure. More specifically, compact embeddings that are similar to one another (e.g., two compact embeddings may be similar to one another if a Euclidian distance between the two compact embeddings is below a threshold) may be stored at locations in the space partitioning data structure that are selected so as to minimize the distance in the space partitioning data structure 240 (e.g., number of hops in the K-D tree) between the compact embeddings that are similar to one another. Furthermore, in some embodiments, the K-D tree may be searchable using a nearest neighbor algorithm.

It should be appreciated that one or more components of the API security model 150 may be implemented using a machine learning model. For example, in some embodiments, the embedding module 220 may be implemented by a machine learning model. More specifically, the embedding module 220 may be implemented in an embedding layer of the machine learning model. Alternatively, or additionally, the dimensionality reduction module 230 may be implemented by a machine learning model.

Operation of API Security Model in Inference Phase

Figure 3:
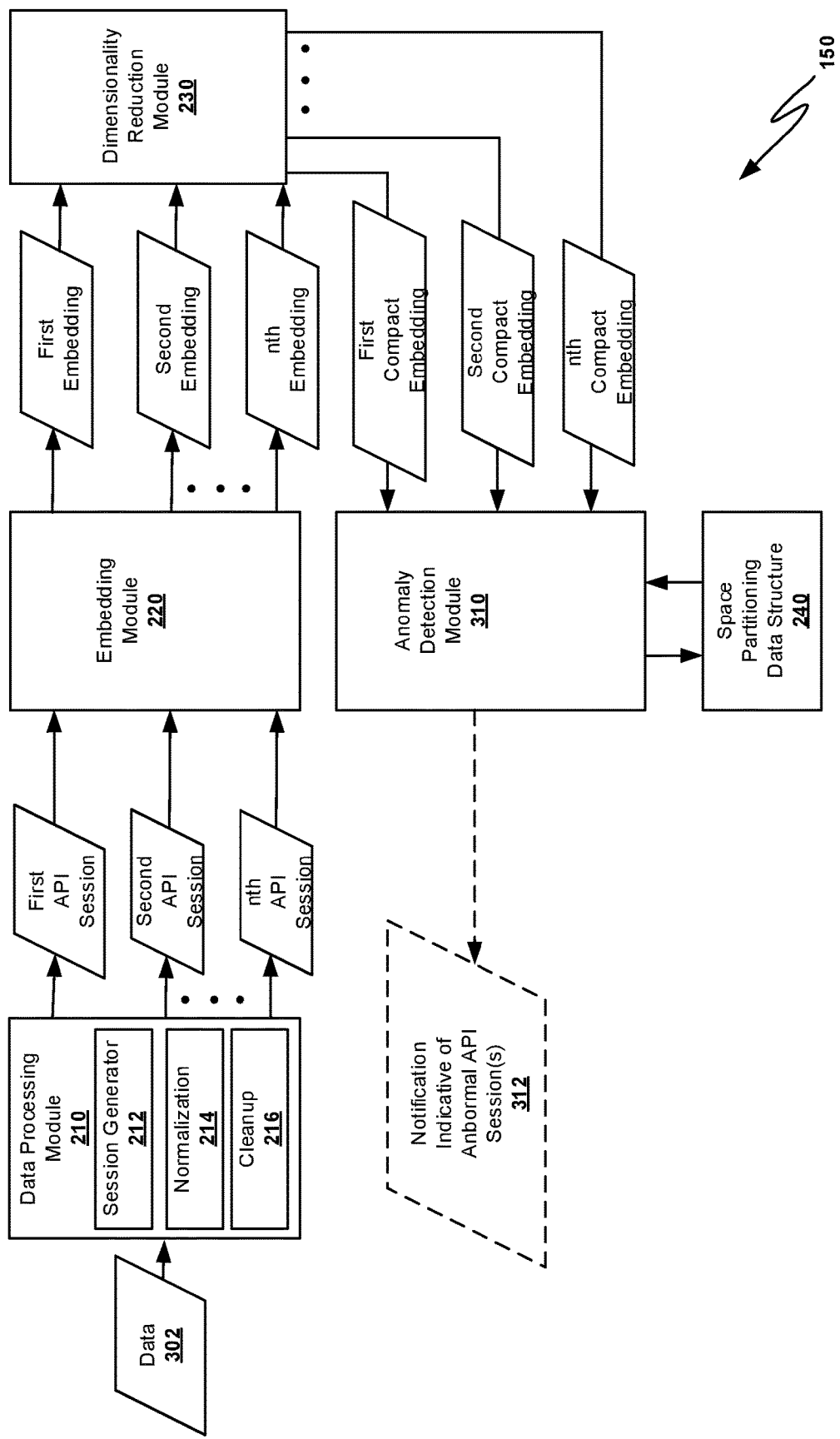
FIG. 3 depicts an API security model operating in an inference phase to detect abnormal API sessions according to some embodiments of the present disclosure.

FIG. 3 depicts the API security model 150 operating in an inference phase to detect abnormal API sessions according to some embodiments of the present disclosure. As shown, the data processing module 210 of the API security model 150 may receive data 302 that includes a plurality of API requests from a plurality of different client devices (such as the client devices 120 of FIG. 1).

The data processing module 210 may be configured to generate a plurality API sessions (e.g, first API session, second API session . . . nth API session) based on the data 302. It should be appreciated that the data processing module 210 may process the data 302 in the same manner as the data processing module 210 processes the training data 202 as discussed above with reference to FIG. 2.

The embedding module 220 may receive the plurality of API sessions (e.g., first API session, second API session . . . nth API session) from the data processing module 210. The embedding module 220 may, as discussed above with reference to FIG. 2, apply the sequence embedding technique (e.g., sequence graph transformation) to the plurality of API sessions to generate a plurality of embeddings (e.g., first embedding, second embedding . . . nth embedding). Each of the plurality of embeddings may correspond to a different API session of the plurality of API sessions received from the data processing module 210. Furthermore, each of the embeddings may be a vector representation of the corresponding API session (e.g, sequence of API requests).

The dimensionality reduction module 230 may receive the plurality of embeddings (e.g., first embedding, second embedding . . . nth embedding) from the embedding module 220. The dimensionality reduction module 230 may apply the dimensionality reduction technique (e.g., principal component analysis) to generate a plurality of compact embeddings (e.g., first compact embedding, second compact embedding . . . nth compact embedding).

The API security model 150 may include an anomaly detection module 310. The anomaly detection module 310 may receive the plurality of compact embeddings from the dimensionality reduction module 230. The anomaly detection module 310 may be configured to access the space partitioning data structure 240 (e.g., K-D tree). Furthermore, the anomaly detection module 310 may be configured to search the space partitioning data structure 240 to identify which of a plurality of reference compact embeddings (that is, the compact embeddings of permissible API sessions determined during the training phase) stored in the space partitioning data structure 240 is closest (e.g., in Euclidean space) to each of the compact embeddings received from the dimensionality reduction module 230.

For each of the API sessions generated based on the data, the anomaly detection module 310 may determine whether a distance (e.g., Euclidean distance) between the corresponding compact embedding and the reference compact embedding that the anomaly detection module 310 determines is closest to the corresponding compact embedding exceeds a threshold distance. If, for one or more of the API sessions, the anomaly detection module 310 determines the distance between the corresponding compact embedding and the reference compact embedding exceeds the threshold distance, the anomaly detection module 310 may perform one or more actions. For instance, in some embodiments, the anomaly detection module 310 may generate a notification 308 indicative of the one or more API sessions being abnormal. Alternatively, or additionally, the anomaly detection module 310 may be configured to update a database (such as the database 160 of FIG. 1) to include the one or more API sessions. In this manner, a record of API sessions that have been determined to be abnormal can be stored in the database.

Figure 4:
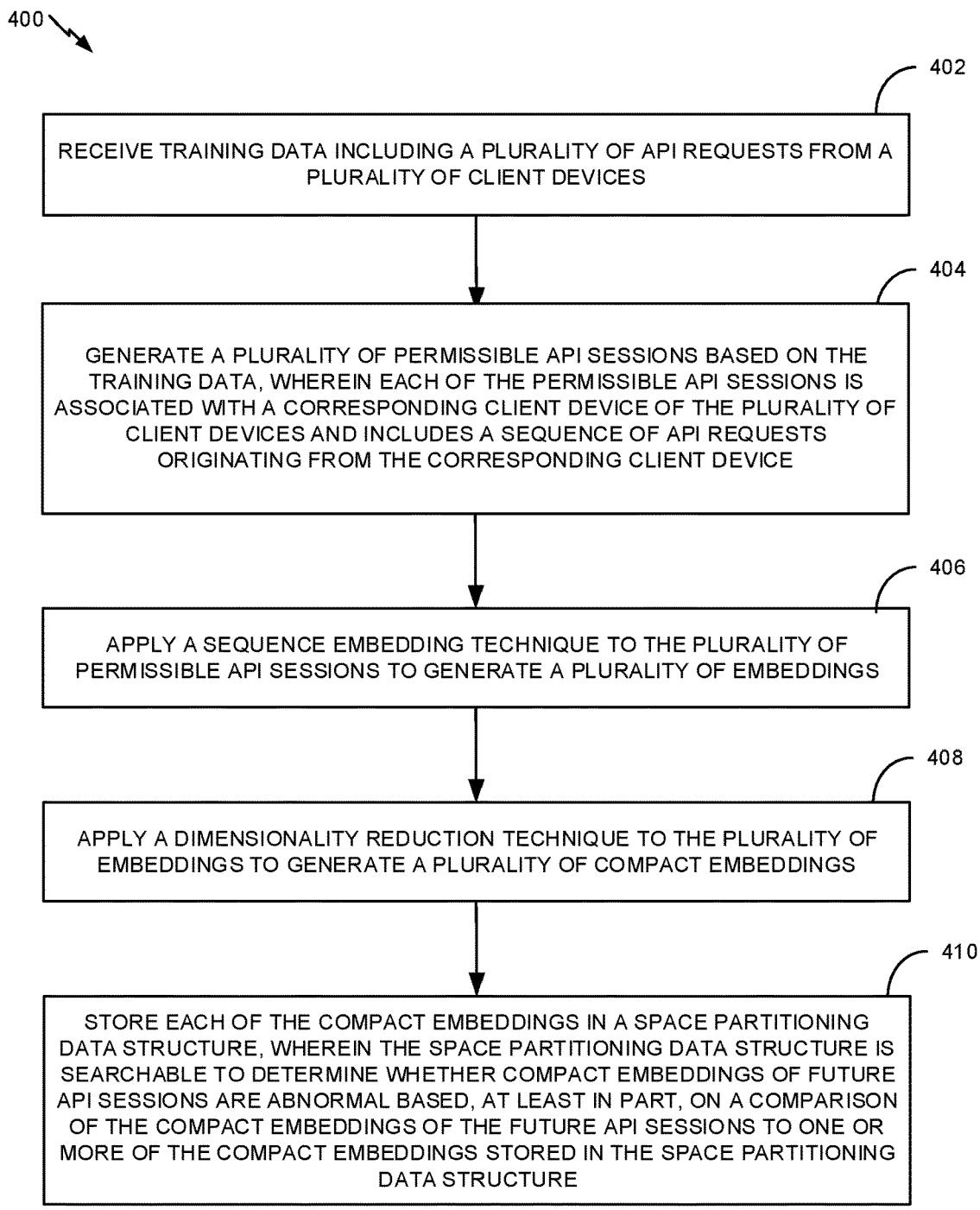
FIG. 4 depicts a flow diagram of a method for populating a space partitioning data structure with compact embeddings indicative of permissible API sessions according to some embodiments of the present disclosure.

Flow Diagram for Method of Populating a Space Partitioning Data Structure with Compact Embeddings of Permissible API Sessions FIG. 4 is a flow diagram of an example method 400 of populating a space partitioning data structure with compact embeddings of permissible API sessions according to some embodiments of the present disclosure. The method 400 may be performed by instructions executing on a processor of a server (such as the server 110 of FIG. 1).

At (402), the method 400 may include receiving training data that includes a plurality of API requests from a plurality of client devices. For example, the training data may include multiple API requests originating from a first client device and multiple API requests originating from a second client device.

At (404), the method 400 may include generating a plurality of permissible API sessions based on the training data. In some embodiments, each of the API sessions may be associated with a corresponding client device of the plurality of client devices. Furthermore, each of the API sessions may include a sequence of API requests originating from the corresponding client device.

At (406), the method 400 may include applying a sequence embedding technique to the plurality of API sessions to generate a plurality of embeddings. For instance, in some embodiments, the sequence embedding technique may include a sequence graph transformation technique.

At (408), the method 400 may include applying a dimensionality reduction technique to the plurality of embeddings to generate a plurality of compact embeddings. For instance, in some embodiments, the dimensionality reduction technique may include a principal component analysis technique that reduces the number of dimensions in the plurality of embeddings generated at (406) by a predetermined amount to generate the plurality of compact embeddings. In some embodiments, the predetermined amount may be greater than 100. In alternative embodiments, the predetermined amount may be greater than 1,000. It should be appreciated, however, that the number of dimensions may be reduced by any suitable number.

At (410), the method 400 may include storing each of the compact embeddings in a space partitioning data structure. In some embodiments, the compact embeddings may be stored in the space partitioning data structure such that compact embeddings that are similar to one another are stored close to one another (e.g., in the same partition) in the space partitioning data structure. It should be appreciated that the space partitioning data structure may be searchable to determine whether compact embeddings of future API sessions are abnormal based, at least in part, on a comparison of the compact embeddings of the future API sessions to one or more of the compact embeddings stored in the space partitioning data structure.

Some embodiments further include preprocessing the plurality of permissible API sessions prior to applying the sequence embedding algorithm to generate the plurality of embeddings. For instance, in some embodiments, the method 400 may include determining whether each of the permissible API sessions generated at (404) include a threshold number (e.g., at least 3) of API requests. Alternatively, or additionally, the method 400 may include determining whether the sequence of API requests included in one or more of the permissible API sessions include more than a threshold number of consecutive API requests for an API service. Additionally, in response to determining the sequence of API requests in the one or more API sessions include more than the threshold number of consecutive API requests for the API service, the method 400 may include removing one or more instances of the consecutive API requests until the sequence of API requests for the one or more permissible API sessions includes the threshold number of consecutive API requests for the API service.

Flow Diagram for Method of Detecting Abnormal API Sessions

Figure 5:
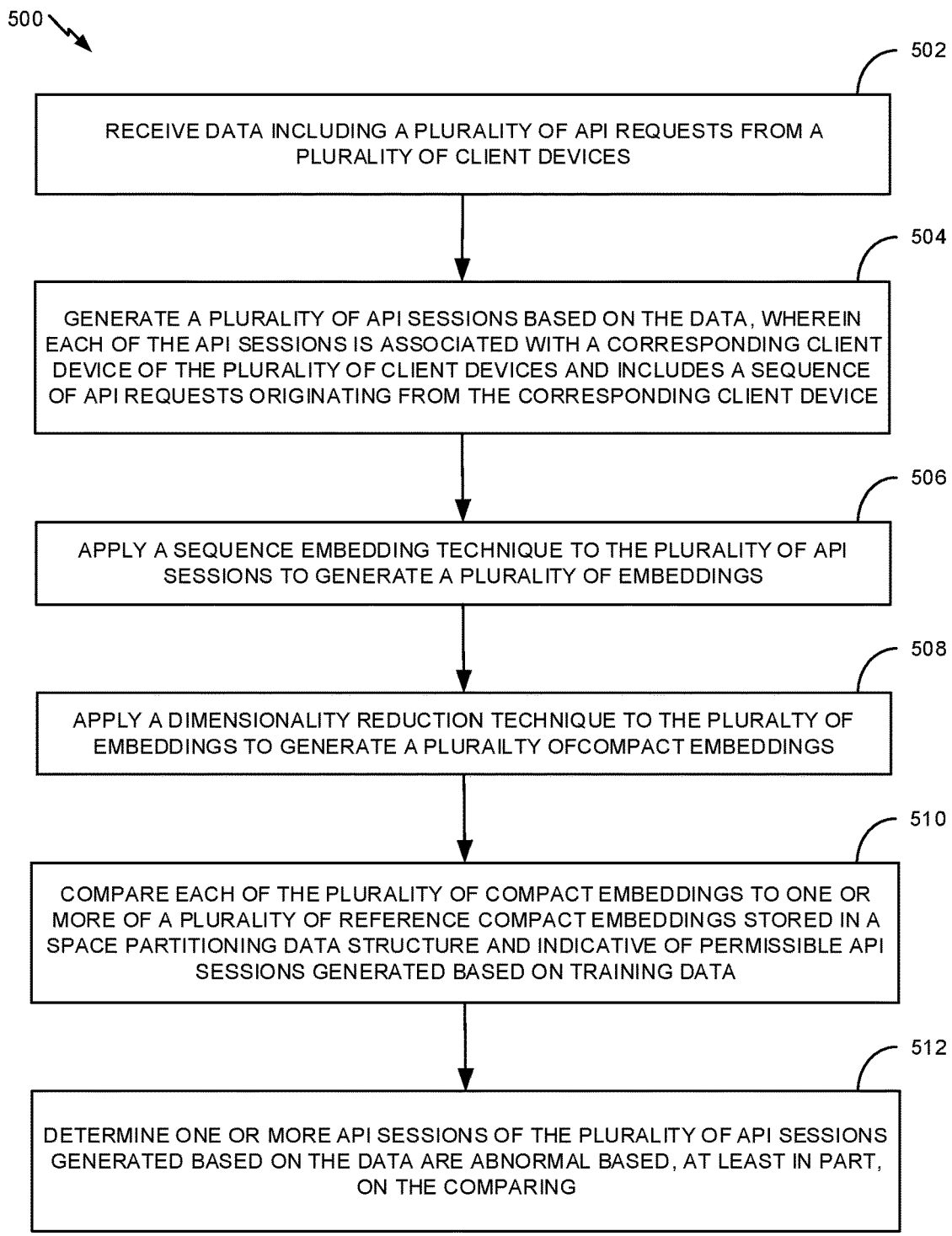
FIG. 5 depicts a flow diagram of a method for detecting abnormal API sessions according to some embodiments of the present disclosure.

FIG. 5 is a flow diagram of an example method 500 for detecting abnormal API sessions according to some embodiments of the present disclosure. The method 500 may be performed by instructions executing on a processor of a server (such as the server 110 of FIG. 1).

At (502), the method 500 may include receiving data that includes a plurality of API requests from a plurality of client devices. For example, the data may include multiple API requests originating from a first client device and multiple API requests originating from a second client device.

At (504), the method 500 may include generating a plurality of API sessions based on the data received at (502). In some embodiments, each of the API sessions may be associated with a corresponding client device of the plurality of client devices. Furthermore, each of the API sessions may include a sequence of API requests originating from the corresponding client device.

At (506), the method 500 may include applying a sequence embedding technique to the plurality of API sessions to generate a plurality of embeddings. For instance, in some embodiments, the sequence embedding technique may include a sequence graph transformation technique.

At (508), the method 500 may include applying a dimensionality reduction technique to the plurality of embeddings to generate a plurality of compact embeddings. For instance, in some embodiments, the dimensionality reduction technique may include a principal component analysis technique that reduces the number of dimensions in the plurality of embeddings generated at (506) by a predetermined amount to generate the plurality of compact embeddings. In some embodiments, the predetermined amount may be greater than 100. In alternative embodiments, the predetermined amount may be greater than 1,000. It should be appreciated, however, that the number of dimensions may be reduced by any suitable number.

At (510), the method 500 may include comparing each of the plurality of compact embeddings generated at (508) to one or more of a plurality of reference compact embeddings stored in a space partitioning data structure (e.g., K-D tree) and indicative of permissible API sessions generated based on training data. For instance, the compact embedding for a corresponding API session may be compared to one or more of the reference compact embeddings to determine which of the reference compact embedding is closest to the compact embedding for the corresponding API session. It should be appreciated that this process may be performed for each of the plurality of compact embeddings.

At (512), the method 500 may include determining one or more API session of the plurality of API sessions generated at (504) based on the data received at (502) are abnormal based, at least in part, on the comparing at (510). For instance, in some embodiments, one or more API sessions may be determined to be abnormal if the distance between the corresponding compact embedding and the reference compact embedding that is closest to the corresponding compact embedding exceeds a threshold distance. In such instances, the one or more API sessions and the associated sequence of API requests are determined to be abnormal.

Some embodiments further include performing one or more actions based, at least in part, on determining one or more API sessions of the plurality of API sessions generated based on the data are abnormal. For instance, in some embodiments, the one or more actions may include generating a notification indicative of the one or more API sessions being abnormal. Alternatively, or additionally, the one or more actions may include updating a database (such as the database 160 of FIG. 1) to include the one or more API sessions determined to be abnormal. In this manner, a record of abnormal API sessions may be maintained on the database. In this manner, API security can be further improved since, in some embodiments, future API sessions may be automatically labeled as abnormal if the sequence of API requests included therein corresponds to (e.g., matches) the sequence of API requests for one of the API sessions included in the record maintained on the database.

Some embodiments further include preprocessing the plurality of permissible API sessions prior to applying the sequence embedding algorithm to generate the plurality of embeddings. For instance, in some embodiments, the method 500 may include determining whether each of the permissible API sessions generated at (504) include a threshold number (e.g., at least 3) of API requests. Alternatively, or additionally, the method 500 may include determining whether the sequence of API requests included in one or more of the permissible API sessions include more than a threshold number of consecutive API requests for an API service. Additionally, in response to determining the sequence of API requests in the one or more API sessions include more than the threshold number of consecutive API requests for the API service, the method 500 may include removing one or more instances of the consecutive API requests until the sequence of API requests for the one or more permissible API sessions includes the threshold number of consecutive API requests for the API service.

Example Computing Systems

Figure 6A:
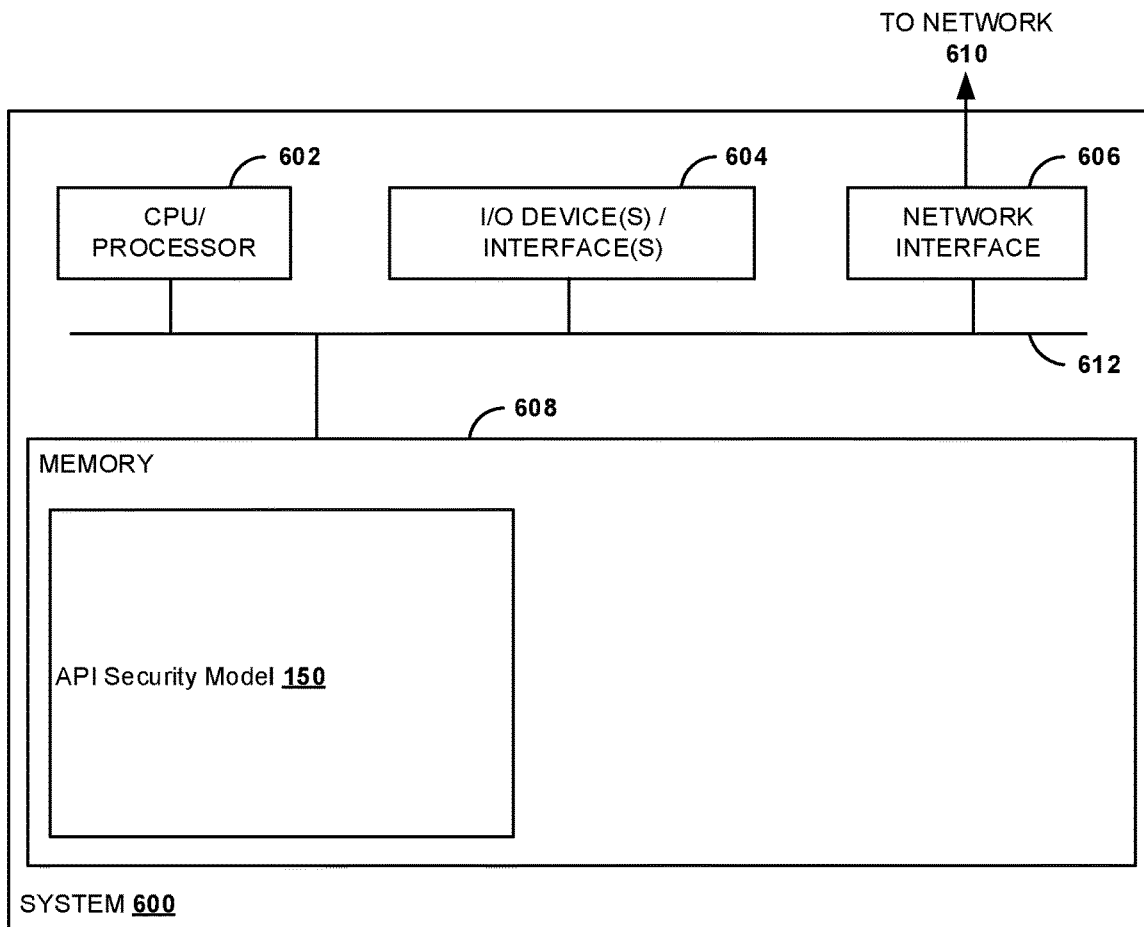
FIGS. 6A and 6B depict example computing systems according to some embodiments of the present disclosure.

FIG. 6A illustrates an example computing system 600 with which embodiments of the computing environment 100 of FIG. 1 may be implemented. For example, the computing system 600 may be representative of the server 110 of FIG. 1.

The computing system 600 includes a central processing unit (CPU) 602, one or more I/O device interfaces 604 that may allow for the connection of various I/O devices 604 (e.g., keyboards, displays, mouse devices, pen input, etc.) to the computing system 600, a network interface 606, a memory 608, and an interconnect 612. It is contemplated that one or more components of the computing system 600 may be located remotely and accessed via a network 610 (e.g., which may be the network 130 of FIG. 1). It is further contemplated that one or more components of the computing system 600 may include physical components or virtualized components.

The CPU 602 may retrieve and execute programming instructions stored in the memory 608. Similarly, the CPU 602 may retrieve and store application data residing in the memory 608. The interconnect 612 transmits programming instructions and application data, among the CPU 602, the I/O device interface 604, the network interface 606, the memory 608. The CPU 602 is included to be representative of a single CPU, multiple CPUs, a single CPU having multiple processing cores, and other arrangements.

Additionally, the memory 608 is included to be representative of a random access memory or the like. In some embodiments, the memory 608 may include a disk drive, solid state drive, or a collection of storage devices distributed across multiple storage systems. Although shown as a single unit, the memory 608 may be a combination of fixed and/or removable storage devices, such as fixed disc drives, removable memory cards or optical storage, network attached storage (NAS), or a storage area-network (SAN).

As shown, the memory 608 may, in some embodiments, include the API security model 150 discussed above with reference to FIGS. 1-3.

Figure 6B:
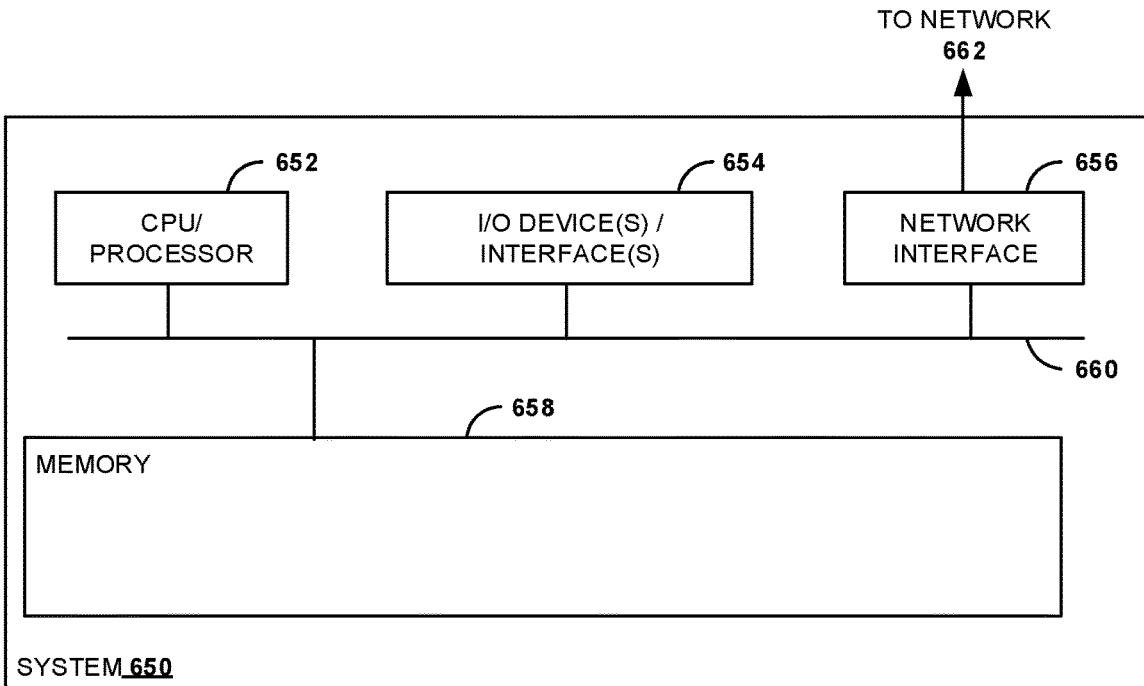

FIG. 6B illustrates an example computing system 650 with which embodiments of the computing environment 100 may be implemented. For example, the computing system 650 may be representative of the client devices 120 of FIG. 1.

The computing system 650 includes a central processing unit (CPU) 652, one or more I/O device interfaces 654 that may allow for the connection of various I/O devices (e.g., keyboards, displays, mouse devices, pen input, etc.) to the computing system 650, a network interface 656, a memory 658, and an interconnect 660. It is contemplated that one or more components of the computing system 650 may be located remotely and accessed via a network 662 (e.g., which may be the network 130 of FIG. 1). It is further contemplated that one or more components of the computing system 650 may include physical components or virtualized components.

The CPU 652 may retrieve and execute programming instructions stored in the memory 658. Similarly, the CPU 562 may retrieve and store application data residing in the memory 658. The interconnect 660 transmits programming instructions and application data, among the CPU 652, the I/O device interface 654, the network interface 656, the memory 658. The CPU 652 is included to be representative of a single CPU, multiple CPUs, a single CPU having multiple processing cores, and other arrangements.

Additionally, the memory 658 is included to be representative of a random access memory or the like. In some embodiments, the memory 658 may include a disk drive, solid state drive, or a collection of storage devices distributed across multiple storage systems. Although shown as a single unit, the memory 658 may be a combination of fixed and/or removable storage devices, such as fixed disc drives, removable memory cards or optical storage, network attached storage (NAS), or a storage area-network (SAN).

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that may execute software.

Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor may read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f)

unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed:

1. A method comprising:
    receiving training data comprising a plurality of application programming interface (API) requests from a plurality of client devices;
    generating a plurality of permissible API sessions based on the training data, wherein each of the permissible API sessions is associated with a corresponding client device of the plurality of client devices and includes a sequence of API requests originating from the corresponding client device;
    prior to generating a plurality of embeddings:
        determining whether each of the plurality of permissible API sessions includes a threshold number of API requests; and
        responsive to determining one or more permissible API sessions included in the plurality of permissible API sessions includes less than the threshold number of API requests, removing the one or more permissible API sessions from the plurality of permissible API sessions;
    applying a sequence embedding technique to the plurality of permissible API sessions to generate the plurality of embeddings;
    applying a dimensionality reduction technique to the plurality of embeddings to generate a plurality of compact embeddings; and
    storing each of the compact embeddings in a space partitioning data structure at storage locations within the space partitioning data structure that are determined based on similarities between the compact embeddings, wherein the space partitioning data structure is searchable to determine whether compact embeddings of future API sessions are abnormal based, at least in part, on a comparison of the compact embeddings of the future API sessions to one or more of the compact embeddings stored in the space partitioning data structure.

2. The method of claim 1, wherein the space partitioning data structure comprises a K-D tree that is searchable using a nearest neighbor search algorithm.

3. The method of claim 1, further comprising:
    prior to generating the plurality of embeddings, determining whether the sequence of API requests for one or more of the permissible API sessions includes more than a threshold number of consecutive API requests for an API service; and
    in response to determining the sequence of API requests for the one or more API sessions include more than the threshold number of consecutive API requests for the API service, removing one or more instances of the consecutive API requests until the one or more API sessions includes the threshold number of consecutive API requests for the API service.

4. The method of claim 1, wherein the sequence embedding technique comprises a sequence graph transformation.

5. The method of claim 1, wherein a number of API requests included in each of the permissible API sessions ranges from 3 API requests to thousands of API requests.

6. The method of claim 1, wherein each of the embeddings generated by applying the sequence embedding technique includes more than 1,000 dimensions and each of the compact embeddings generated by applying the dimensionality reduction technique includes less than 100 dimensions.

7. A computing system comprising:
    one or more processors; and
    one or more memory configured to store computer executable instructions that, when executed by the one or more processors, cause the one or more processors to:
        receive training data comprising a plurality of application programming interface (API) requests from a plurality of client devices;
        generate a plurality of permissible API sessions based on the training data, wherein each of the permissible API sessions is associated with a corresponding client device of the plurality of client devices and includes a sequence of API requests originating from the corresponding client device;
        prior to generating a plurality of embeddings:
            determine whether each of the plurality of permissible API sessions includes a threshold number of API requests; and
            in response to determining one or more permissible API sessions included in the plurality of permissible API sessions includes less than the threshold number of API requests, removing the one or more permissible API sessions from the plurality of permissible API sessions;
        apply a sequence embedding technique to the plurality of API sessions to generate the plurality of embeddings;
        apply a dimensionality reduction technique to the plurality of embeddings to generate a plurality of compact embeddings; and
        store each of the compact embeddings in a space partitioning data structure at storage locations within the space partitioning data structure that are determined based on similarities between the compact embeddings, wherein the space partitioning data structure is searchable to determine whether compact embeddings of future API sessions are abnormal based, at least in part, on a comparison of the compact embeddings of the future API sessions to one or more of the compact embeddings stored in the space partitioning data structure.

8. The computing system of claim 7, wherein the space partitioning data structure comprises a K-D tree that is searchable using a nearest neighbor search algorithm.

9. The computing system of claim 7, wherein prior to generating the embeddings, the one or more processors are further configured to:
    determine whether the sequence of API requests for one or more of the permissible API sessions include more than a threshold number of consecutive API requests for an API service; and
    in response to determining the sequence of API requests for the one or more permissible API sessions include more than the threshold number of consecutive API requests for the API service, the one or more processors are configured to remove one or more instances of the consecutive API requests for the API service until the sequence of API requests for the one or more API sessions includes less than the threshold number of consecutive API requests for the API service.

10. The computing system of claim 7, wherein the sequence embedding technique comprises a sequence graph transformation.

11. The computing system of claim 7, wherein a number of API requests included in each of the plurality of permissible API sessions ranges from 3 API requests to thousands of API requests.

12. The computing system of claim 7, wherein each of the embeddings generated by applying the sequence embedding technique includes more than 1,000 dimensions and each of the compact embeddings generated by applying the dimensionality reduction technique includes less than 100 dimensions.

13. A method comprising:
receiving data comprising a plurality of API requests from a plurality of client devices;
generating a plurality of API sessions based on the data, wherein each of the API sessions is associated with a corresponding client device of the plurality of client devices and includes a sequence of API requests originating from the corresponding client device;
applying a sequence embedding technique to the plurality of API sessions to generate a plurality of embeddings;
applying a dimensionality reduction technique to the plurality of embeddings to generate a plurality of compact embeddings;
comparing each of the plurality of compact embeddings to one or more of a plurality of reference compact embeddings stored in a space partitioning data structure and indicative of permissible API sessions generated based on training data, wherein the plurality of reference compact embeddings are stored such that similar reference compact embeddings of the plurality of reference compact embeddings are located near one another within the space partitioning data structure; and
determining one or more API sessions of the plurality of API sessions generated based on the data are abnormal based, at least in part, on the comparing, wherein the determining comprises determining a distance between a corresponding compact embedding for the one or more API sessions and one of the reference compact embeddings that is closest to the corresponding compact embedding exceeds a threshold distance.

14. The method of claim 13, wherein the distance is a Euclidian distance.

15. The method of claim 13, further comprising performing one or more actions based on determining the one or more API sessions are abnormal.

16. The method of claim 15, wherein the one or more actions comprise generating a notification indicative of the one or more API sessions being abnormal.

17. The method of claim 15, wherein the one or more actions comprise updating a database to include the one or more API sessions determined to be abnormal.

* * * * *